(12) United States Patent
Li

(10) Patent No.: US 11,950,574 B1
(45) Date of Patent: Apr. 9, 2024

(54) FEEDING OBSERVATION DEVICE

(71) Applicant: ShenZhen Shouli Intelligent Technology Co. LTD, Guangdong (CN)

(72) Inventor: Zheng Li, Guangdong (CN)

(73) Assignee: ShenZhen Shouli Intelligent Technology Co. LTD, Shenzhen (CN)

( * ) Notice: Subject to any disclaimer, the term of this patent is extended or adjusted under 35 U.S.C. 154(b) by 0 days.

(21) Appl. No.: 18/239,120

(22) Filed: Aug. 28, 2023

(30) Foreign Application Priority Data

Jul. 28, 2023 (CN) .......................... 202322032147.6

(51) Int. Cl.
*A01K 39/012* (2006.01)
*A01K 29/00* (2006.01)

(52) U.S. Cl.
CPC .......... *A01K 39/012* (2013.01); *A01K 29/005* (2013.01)

(58) Field of Classification Search
CPC .. A01K 39/012; A01K 39/01; A01K 39/0113; A01K 39/0125; A01K 39/04; A01K 29/005; A01K 31/06; A01K 31/12; A01K 5/0114; A01K 5/0225; A01K 31/14
See application file for complete search history.

(56) References Cited

U.S. PATENT DOCUMENTS

| | | | | |
|---|---|---|---|---|
| 7,149,422 B2 * | 12/2006 | Schnell | ................. | G03B 17/00 396/153 |
| 10,499,618 B2 * | 12/2019 | Klein | ..................... | H04N 7/188 |
| D1,000,002 S * | 9/2023 | Guo | ............................ | D30/110 |
| 2012/0048203 A1 * | 3/2012 | Bonham | ............... | A01K 31/14 119/421 |
| 2014/0182518 A1 * | 7/2014 | Boehm | ............... | A01K 31/007 119/429 |
| 2015/0373945 A1 * | 12/2015 | Sung | ................... | A01K 11/006 119/51.02 |
| 2016/0156989 A1 * | 6/2016 | Lovett | ................... | H04N 7/183 348/143 |
| 2016/0366319 A1 * | 12/2016 | Perkins | ............. | H04N 1/00209 |
| 2019/0110444 A1 * | 4/2019 | Boehm | .................. | A01K 45/00 |

* cited by examiner

*Primary Examiner* — Trinh T Nguyen

(57) ABSTRACT

The invention provides a feeding observation device, which comprises a feeding base and a body arranged above the feeding base, wherein the body is provided with a bird food storage chamber for bird food for birds to eat; the device further comprises a camera module, a motion sensor module, at least one PCB and at least one conducting wire electrically connecting with the PCB, the imaging range of the camera module and the sensing range of the motion sensor module are at least partially overlapped, and at least one of the camera module and the motion sensor module is electrically connecting with at least one of the PCB and the conducting wires and coaxially rotatable on the body or the feeding base. When the camera or the motion sensor module is adjusted, the PCB or the conducting wire will not be affected, so that the device can work stably.

18 Claims, 2 Drawing Sheets

FEEDING OBSERVATION DEVICE

CROSS REFERENCE TO RELATED APPLICATIONS

The present application claims the benefit of Chinese Patent Application No. 202322032147.6 filed on Jul. 28, 2023, the contents of which are incorporated herein by reference in their entirety.

BACKGROUND OF THE INVENTION

1. Technical Field

The invention relates to the technical field of bird feeding and observation, in particular to a feeding observation device.

2. Description of Related Art

In order to observe birds, feeders are needed to attract birds through food. Previously, people observed birds mainly through long-distance observation or using telescopes. In this case, it is difficult to take pictures and share fun. Therefore, a feeding observation device is usually used to lure birds, and a camera is installed on the feeding observation device to shoot birds. However, because the camera is electrically connected with at least one PCB or at least one conducting wire, if there is a motion sensor module, the motion sensor module may also be electrically connected with at least one PCB or at least one conducting wire, which will affect the PCB or the conducting wire when adjusting the camera or the motion sensor module, and lead to electrical connection problems after a long time, so that the feeder cannot work stably or even fail. How to improve the stability and reliability of electrical connection of the camera or the motion sensor module of the feeder is an urgent problem to be solved.

BRIEF SUMMARY OF THE INVENTION

The technical problem to be solved by the invention is to provide an improved feeding observation device aiming at the defects in the related art.

The technical proposal adopted by the invention for solving the technical problem comprises: providing a feeding observation device, which comprises a feeding base and a body arranged above the feeding base, wherein the body is provided with a bird food storage chamber for bird food for birds to eat; The feeding observation device further comprises a camera module for photographing birds, a motion sensor module for sensing the presence of a bird, at least one PCB and at least one conducting wire electrically connecting with the PCB, the imaging range of the camera module and the sensing range of the motion sensor module at least partially overlapping, at least one of the camera module and the motion sensor module is electrically connecting with at least one of the PCB and the conducting wire, and coaxially rotatable on the body or the feeding base.

Preferably, the body comprises a transparent or semitransparent observation structure on a side and/or front, which is used for observing the bird food storage chamber.

Preferably, the body comprises a reinforcing frame, and the reinforcing frame is disposed at the edge and/or inside of the observation structure.

Preferably, the feeding observation device comprises an anti-animal-bite structure arranged at the edges and/or corners.

Preferably, the anti-animal-bite structure is made of metal or plastic material containing capsaicin.

Preferably, the feeding observation device comprises an containing bin with at least a part arranged in the body, the containing bin is opening to the outside of the body, at least a part of the camera module is arranged in the containing bin and photographs outward from the opening of the containing bin, at least a part of the motion sensor module is arranged in the containing bin and sensing outward from the opening of the containing bin, at least a part of the PCB is arranged in the containing bin and/or at least a part of the conducting wire is arranged in the containing bin.

Preferably, the feeding observation device comprises a fixing frame, the camera module and/or the motion sensor module are fixed on the inner side of the fixing frame, and the fixing frame and the containing bin are rotationally connected.

Preferably, the feeding observation device comprises an elastic member, and the elastic member is arranged between the outer side of the fixing frame and the inner side of the containing bin and contacts with the inner side of the containing bin.

Preferably, the feeding observation device comprises a rotational fastener, the rotational fastener is connecting with the containing bin and the fixing frame, the fixing frame is rotatable arranged around the rotational fastener, the rotational fastener makes the containing bin contact with the elastic member.

Preferably, the feeding observation device comprises a light sensing module, a night-vision light supplement module, a user feedback indication module, a sound pickup module, a control module, a playback module, a storage module, a restart key and/or a wireless module for transmitting and receiving signals, at least a portion of which is rotated coaxially with the camera module, the motion sensor module, the PCB and/or the conducting wire.

Preferably, the body is provided with a bird food outlet connecting with the bird food storage chamber and leading to the feeding base, and the body is provided with a bird food sliding guide structure inclining towards the bird food outlet for bird food flowing out to the feeding base; and/or, the cross-sectional area of the bird food outlet is smaller than the maximum cross-sectional area of the bird food storage chamber.

Preferably, the body is provided with a bird food outlet connecting with the bird food storage chamber and leading to the feeding base, the bird food outlet is arranged at the lower part of the body, the bird food storage chamber comprises at least two channels leading from the upper part to the lower part, and the channels pass through the side surfaces of the camera module, the motion sensor module, the PCB and the conducting wire.

Preferably, the feeding base is provided with an open bird food area communicated with the bird food storage chamber for birds to eat and a wall structure for preventing bird food from leaving the bird food area; and/or the feeding base is provided with a bird standing structure for birds to stand.

The technical proposal of the invention has at least the following beneficial effects: at least one of the camera module and the motion sensor module of the feeding observation device, is electrically connected with at least one of the PCB and the conducting wire and rotate coaxially; When the camera or the motion sensor module is adjusted, the PCB or the conducting wire will not be affected, and it will not cause electrical connection problem even after a long time, so that the feeding observation device can work stably.

BRIEF DESCRIPTION OF THE SEVERAL VIEWS OF THE DRAWINGS

In order to more clearly illustrate the technical solutions in the embodiments of the invention, the following is a brief introduction to the embodiments or the drawings used in the description of the prior art. Obviously, the drawings in the following description are only some embodiments of the invention. For those of ordinary skill in the art, other figures may also be derived from these figures.

Figure 1:
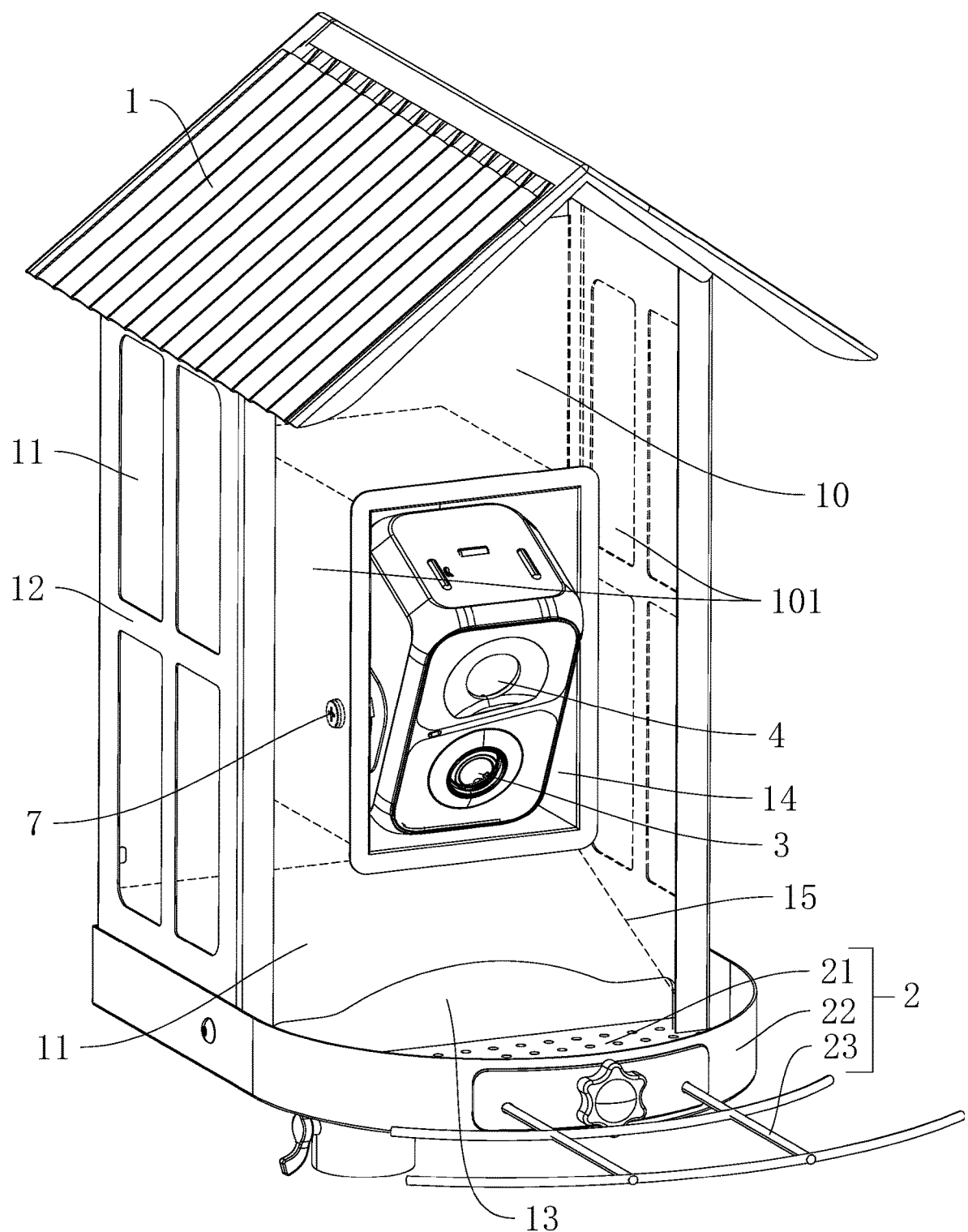
FIG. 1 is a perspective view of the feeding observation device of the invention (the dotted line in the figure shows the internal contour line seen through the observation structure 11).

The labels in the figure indicate: Body 1, bird food storage chamber 10, Channel 101, Observation structure 11, Reinforcing frame 12, bird food outlet 13, Containing bin 14, bird food sliding guide structure 15, Feeding base 2, bird food area 21, Wall structure 22, Bird standing structure 23, Camera module 3, Motion sensor module 4, PCB 5, Fixing frame 6, Rotational fastener 7 and Elastic member 8.

DETAILED DESCRIPTION OF THE INVENTION

For a clearer understanding of the technical features, purposes and effects of the invention, the specific embodiments of the invention are described in detail with reference to the drawings. It should be understood that if the directions or positional relationships indicated by "front", "rear", "upper", "lower", "left", "right", "vertical" "horizontal", "top", "bottom", "inner", "outer" and so on in the text are based on the directions or positional relationships shown in the drawings and are constructed and operated in specific directions, it is only for the convenience of describing the technical solution. Rather than indicating that the device or element referred to must have a specific orientation, it is not to be construed as limiting the present invention. It should also be noted that unless otherwise specified and limited, the terms "mounting", "connecting", "connecting", "fixing", "setting" and so on should be interpreted in a broad sense, for example, they can be fixed connection, detachable connection or integration; it can be directly connected or indirectly connected through an intermediate medium, and it can be the internal connection of two components or the interaction relationship of two components. When an element is referred to as being "above" or "below" another element, the element can be "directly" or "indirectly" above the other element or there may also be one or more intervening elements. Those of ordinary skill in the art can understand the specific meanings of the above terms in the invention according to specific circumstances.

In the following description, for purposes of explanation and not limitation, specific details are set forth such as the particular system architecture, techniques, etc., in order to provide a thorough understanding of the present invention. However, it will be apparent to those skilled in the art that the present invention may be practiced in other embodiments without these specific details. In other instances, detailed descriptions of well-known systems, devices, circuits, and methods are omitted so as not to obscure the description of the present invention with unnecessary detail.

Figure 2:
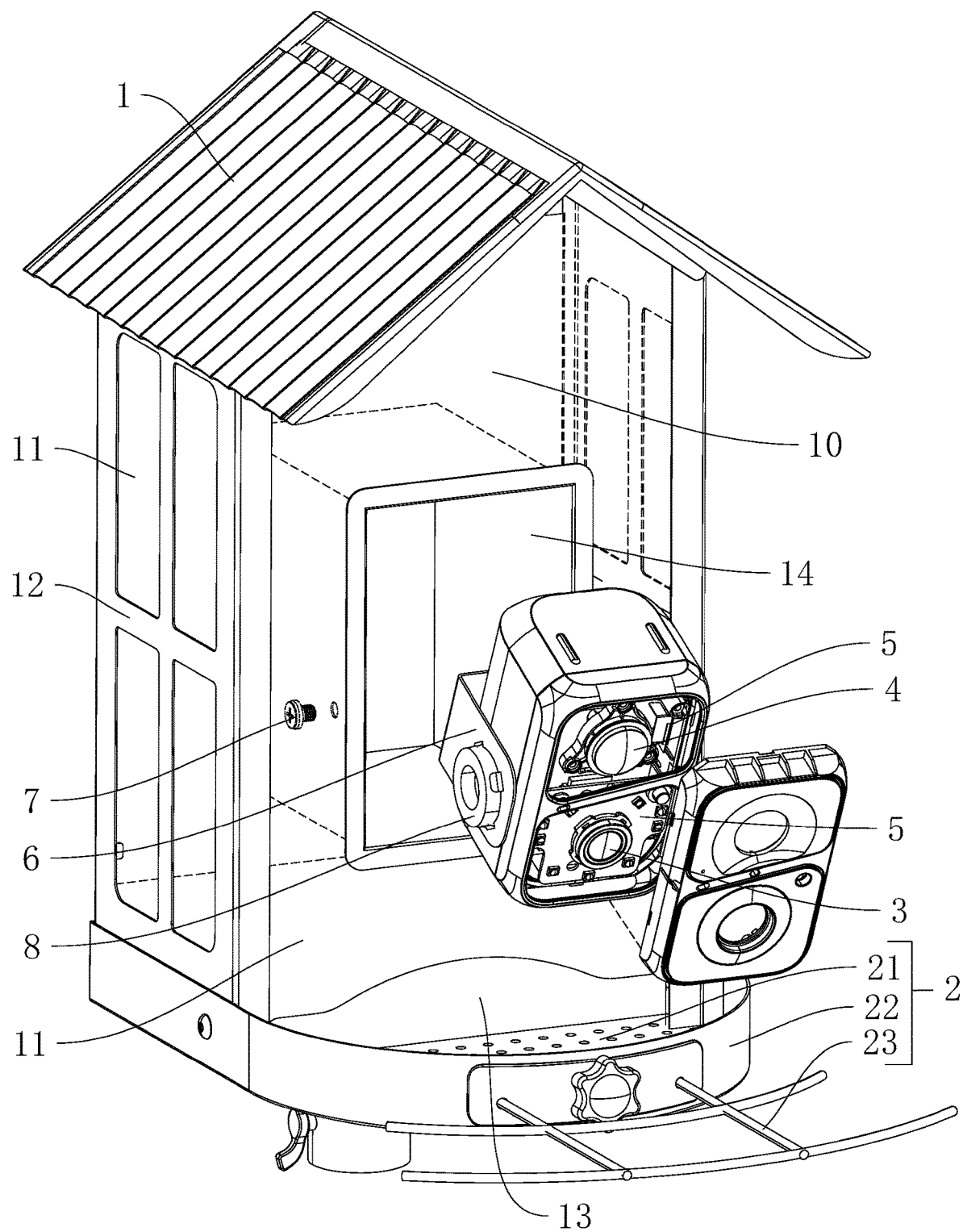
FIG. 2 is an explosion diagram of the feeding observation device of FIG. 1 (the dotted line in the diagram shows the internal contour as seen through the observation structure 11).

Referring to FIGS. 1-2, a feeding observation device in an embodiment of the invention comprises a feeding base 2 and a body 1 arranged above the feeding base 2, wherein the body 1 is provided with a bird food storage chamber 10 for bird food for birds to eat; The feeding observation device further comprises an camera module 3 for photographing birds, a motion sensor module 4 for sensing the presence of a bird, at least one PCB 5, and at least one conducting wire electrically connecting with the PCB 5, the imaging range of the camera module 3 and the sensing range of the motion sensor module 4 at least partially overlapping, at least one of the camera module 3 and the motion sensor module 4 is electrically connecting with at least one of the PCB 5 and the conducting wire, and coaxially rotatable on the body 1 or the feeding base 2.

The feeding observation device can attract birds to eat bird food, the motion sensor module 4 senses that a bird is being attracted, and controls the camera module 3 to start shooting the bird. So that when the motion sensor module 4 does not sense does not sense a bird approaching, the camera module 3 is controlled to be in an OFF state, thus saving energy consumption; when the motion sensor module 4 senses that a bird is approaching, the camera module 3 is controlled to start shooting birds. The invention combines the motion sensor module 4 to trigger the camera module 3 to shoot quickly, which has the advantages of saving electricity and reducing the energy consumption of the whole device.

At least one of the camera module 3 and the motion sensor module 4 is electrically connected with at least one of the PCB 5 and the conducting wire and rotate coaxially. When the camera or the motion sensor module 4 is adjusted, the PCB 5 or the conducting wire will not be affected, and it will not cause electrical connection problem even after a long time, so that the feeding observation device can work stably.

The body 1 comprises a transparent or semitransparent observation structure 11 on a side and/or the front which is used for observing the bird food storage chamber 10. Specifically, the body 1 may have a window, and a transparent or semitransparent observation structure 11 constitutes an observation window for observing the bird food storage chamber 10. Preferably, the observation structure 11 is arranged on a plurality of side surfaces of the body 1, so that the bird food storage chamber 10 can be observed from different directions.

The body 1 comprises a reinforcing frame 12, and the reinforcing frame 12 is arranged at the edge and/or inside of the observation structure 11. The reinforcing frame 12 is preferably made of metal material, which constitutes a supporting structure of the body 1 to improve the strength of the body 1.

Since bird food is contained in the device, it is easy to attract other animals, especially rodents, to bite the device and eat the bird food in the device. Therefore, the feeding observation device comprises an anti-animal-bite structure arranged at the edges and/or corners. Preferably, the anti-animal-bite structure is made of metal or plastic material containing capsaicin, the metal material being hard enough to prevent the animal from biting; Plastic materials containing capsaicin are irritating and can also prevent animals from biting.

The feeding observation device comprises a containing bin 14 having at least a part arranged in the body 1, the containing bin 14 opens to the outside of the body 1, at least a part of the camera module 3 is arranged in the containing bin 14 and photographing outward from the opening of the containing bin 14, at least a part of the motion sensor module 4 is arranged in the containing bin 14 and sensing outward from the opening of the containing bin 14, at least a part of the PCB 5 is arranged in the containing bin 14 and/or at least a part of the conducting wire is arranged in the containing bin 14.

The feeding observation device comprises a fixing frame 6, a camera module 3 and/or a motion sensor module 4 are fixed on the inner side of the fixing frame 6, and the fixing frame 6 is rotationally connected with the containing bin 14, thereby realizing coaxial rotation of the camera module 3, the motion sensor module 4, the PCB 5 and the conducting wire. The feeding observation device comprises an elastic member 8; the elastic member 8 is arranged between the outer side of the fixing frame 6 and the inner side of the containing bin 14, and contacts with the inner side of the containing bin 14 to increase the friction force of rotation. The feeding observation device comprises a rotational fastener 7, and the rotational fastener 7 can be a threaded rotational fastener, an elastic member 8 is arranged circumferentially around the rotational fastener 7, the rotational fastener 7 is connecting with the containing bin 14 and the fixing frame 6, the fixing frame 6 is rotatable arranged around the rotational fastener 7, and the rotational fastener 7 makes the containing bin 14 to come into close contact with the elastic member 8.

The feeding observation device comprises a light sensing module, a night vision light supplement module, a user feedback indication module, a sound pickup module for receiving sound, a control module, a playback module for playing sound, a storage module for storing data, a restart key and/or a wireless module for transmitting and receiving signals, at least a portion of which is rotated coaxially with a camera module 3, a motion sensor module 4, a PCB 5 and a conducting wire, The body 1 is provided with a bird food outlet 13 communicating with the bird food storage chamber 10 and leading to the feeding base 2, and the body 1 is provided with a bird food sliding guide structure 15 inclining towards the bird food outlet 13 for bird food flowing out to the feeding base 2; And/or, the cross-sectional area of the bird food outlet 13 is smaller than the maximum cross-sectional area of the bird food storage chamber 10, thereby controlling the bird food output.

The body 1 is provided with a bird food outlet 13 communicating with the bird food storage chamber 10 and leading to the feeding base 2. The bird food outlet 13 is arranged at the lower part of the body 1. The bird food storage chamber 10 comprises at least two channels 101 leading from the upper part to the lower part. The channels 101 pass through the side surfaces of the camera module 3, the motion sensor module 4, the PCB 5 and the conducting wire. The bird food in the upper part of the bird food storage chamber 10 flows to the lower part of the bird food storage chamber 10 through the channels 101 and then flows out from the bird food outlet 13. The design of at least two channels 101 can supply bird food through other channel 101 when some channel 101 are blocked, thus ensuring the reliability of bird food supply.

The feeding base 2 is provided with an open bird food area 21 for feeding birds, which is communicated with the bird food storage chamber 10 and a wall structure 22 for preventing bird food from leaving the bird food area 21; and/or the feeding base 2 is provided with a bird standing structure 23 for birds standing. The bird standing structure 23 is arranged near the bird food outlet 13 so that the birds can stick to the bird standing structure 23 and eat the bird food in the bird food area 21. The camera module 3 photographs the birds.

The above description is only a preferred embodiment of the invention, and is not intended to limit the invention. For those skilled in the art, the invention can have various modifications, combinations and changes. Any modification, equivalent substitution, improvement, etc. within the spirit and principle of the invention shall be included in the scope of the claims of the invention.

What is claimed is:

1. A feeding observation device, comprises a feeding base (2) and a body (1) arranged above the feeding base (2), wherein the body (1) is provided with a bird food storage chamber (10); the feeding observation device further comprises a camera module (3) for photographing birds, a motion sensor module (4) for sensing the presence of a bird, at least one PCB (5) and at least one conducting wire electrically connected with the at least one PCB (5); the imaging range of the camera module (3) and the sensing range of the motion sensor module (4) are at least partially overlapping; at least one of the camera module (3) and the motion sensor module (4) is electrically connecting with at least one of the PCB (5) and the conducting wire, and coaxially rotatable in or on the body (1) or the feeding base (2); the feeding observation device comprises an containing bin (14) with at least a part arranged in the body (1), the containing bin (14) opens to the outside of the body (1), at least a part of the camera module (3) is arranged in the containing bin (14) and photographing outward from the opening of the containing bin (14), at least a part of the motion sensor module (4) is arranged in the containing bin (14) and sensing outward from the opening of the containing bin (14), at least a part of the PCB (5) is arranged in the containing bin (14) or at least a part of the conducting wire is arranged in the containing bin (14); the feeding observation device comprises a fixing frame (6), the camera module (3) or the motion sensor module (4) are fixed on the inner side of the fixing frame (6), and the fixing frame (6) is rotationally connected with the containing bin (14); the feeding observation device comprises an elastic member (8), wherein the elastic member (8) is arranged between the outer side of the fixing frame (6) and the inner side of the containing bin (14).

2. The feeding observation device according to claim 1, wherein, the body (1) comprises at least one transparent or semitransparent observation structure (11) on a side or the front which is used for observing the bird food storage chamber (10).

3. The feeding observation device according to claim 2, wherein, the body (1) comprises at least one reinforcing frame (12) and the reinforcing frame (12) is arranged at the edge or outside of the observation structure (11).

4. The feeding observation device according to claim 3, wherein the feeding observation device comprises at least one anti-animal-bite structure arranged outside of the bird food storage chamber.

5. The feeding observation device according to claim 4, wherein the anti-animal-bite structure is made of metal or plastic material containing capsaicin.

6. The feeding observation device according to claim 1, wherein the elastic member (8) contacts with the inner side of the containing bin (14).

7. The feeding observation device according to claim 1, wherein the feeding observation device comprises a rotational fastener (7), and the rotational fastener (7) is connecting with the containing bin (14) and the fixing frame (6), the fixing frame (6) is rotatable arranged around the rotational fastener (7), the rotational fastener (7) makes the containing bin (14) contact with the elastic member (8).

8. The feeding observation device according to claim 1, wherein the feeding observation device comprises a light sensing module, a night-vision light supplement module, a user feedback indication module, a sound pickup module, a control module, a playback module, a storage module, a restart key or a wireless module for transmitting and receiving signals, at least a portion of which is rotated coaxially with the camera module (3), the motion sensor module (4), the PCB (5), or the conducting wire.

9. The feeding observation device according to claim 1, wherein the body is provided with a bird food outlet (13) communicating with the bird food storage chamber (10) and leading to the feeding base (2), and the body (1) is provided with a bird food sliding guide structure (15) inclining towards the bird food outlet (13) for bird food flowing out to the feeding base (2); or, the cross-sectional area of the bird food outlet (13) is smaller than the maximum cross-sectional area of the bird food storage chamber (10).

10. The feeding observation device according to claim 1, wherein the body (1) is provided with a bird food outlet (13) communicating with the bird food storage chamber (10) and leading to the feeding base (2), and the bird food outlet (13) is arranged at the lower part of the body (1), the bird food storage chamber (10) comprises at least two channels (101) leading from the upper part to the lower part, and the channels (101) pass through the side surfaces of the camera module (3), the motion sensor module (4), the PCB (5) and the conducting wire.

11. The feeding observation device according to claim 9, wherein the feeding base (2) is provided with an open bird food area (21) for feeding birds and communicated with the bird food storage chamber (10) and a wall structure (22) for preventing bird food from leaving the bird food area (21); or the feeding base (2) is provided with a bird standing structure (23) for birds standing.

12. The feeding observation device according to claim 1, wherein, the body (1) comprises at least one transparent or semitransparent observation structure (11) on a side and the front which is used for observing the bird food storage chamber (10).

13. The feeding observation device according to claim 2, wherein, the body (1) comprises at least one reinforcing frame (12) and the reinforcing frame (12) is arranged at the edge and outside of the observation structure (11).

14. The feeding observation device according to claim 1, wherein the feeding observation device comprises an containing bin (14) with at least a part arranged in the body (1), the containing bin (14) opens to the outside of the body (1), at least a part of the camera module (3) is arranged in the containing bin (14) and photographing outward from the opening of the containing bin (14), at least a part of the motion sensor module (4) is arranged in the containing bin (14) and sensing outward from the opening of the containing bin (14), at least a part of the PCB (5) is arranged in the containing bin (14) and at least a part of the conducting wire is arranged in the containing bin (14).

15. The feeding observation device according to claim 14, wherein the feeding observation device comprises a fixing frame (6), the camera module (3) and the motion sensor module (4) are fixed on the inner side of the fixing frame (6), and the fixing frame (6) is rotationally connected with the containing bin (14).

16. The feeding observation device according to claim 1, wherein the feeding observation device comprises a light sensing module, a night-vision light supplement module, a user feedback indication module, a sound pickup module, a control module, a playback module, a storage module, a restart key and a wireless module for transmitting and receiving signals, at least a portion of which is rotated coaxially with the camera module (3), the motion sensor module (4), the PCB (5), and the conducting wire.

17. The feeding observation device according to claim 1, wherein the body is provided with a bird food outlet (13) communicating with the bird food storage chamber (10) and leading to the feeding base (2), and the body (1) is provided with a bird food sliding guide structure (15) inclining towards the bird food outlet (13) for bird food flowing out to the feeding base (2); and the cross-sectional area of the bird food outlet (13) is smaller than the maximum cross-sectional area of the bird food storage chamber (10).

18. The feeding observation device according to claim 9, wherein the feeding base (2) is provided with an open bird food area (21) for feeding birds and communicated with the bird food storage chamber (10) and a wall structure (22) for preventing bird food from leaving the bird food area (21); and the feeding base (2) is provided with a bird standing structure (23) for birds standing.

* * * * *